United States Patent
Lee et al.

(10) Patent No.: US 8,463,717 B2
(45) Date of Patent: Jun. 11, 2013

(54) METHOD AND APPARATUS FOR PREDICTING PREFERENCE RATING FOR CONTENT, AND METHOD AND APPARATUS FOR SELECTING SAMPLE CONTENT

(75) Inventors: Jae-hwang Lee, Seoul (KR); Cheol-ju Hwang, Yongin-si (KR); Soo-hong Park, Yongin-si (KR); Min-ho Lee, Gwacheon-si (KR); Jung-hyun Oh, Seoul (KR); Yong-wook Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 691 days.

(21) Appl. No.: 12/618,386

(22) Filed: Nov. 13, 2009

(65) Prior Publication Data
US 2010/0191680 A1     Jul. 29, 2010

(30) Foreign Application Priority Data
Jan. 23, 2009   (KR) .................. 10-2009-0006019

(51) Int. Cl.
*G06F 15/18*       (2006.01)
*G06F 7/00*        (2006.01)

(52) U.S. Cl.
USPC ........................................ 706/12; 707/705

(58) Field of Classification Search
None
See application file for complete search history.

(56) References Cited

U.S. PATENT DOCUMENTS

| 6,606,624 B1* | 8/2003 | Goldberg ........................... 1/1 |
| 2005/0076093 A1* | 4/2005 | Michelitsch et al. ........ 709/217 |
| 2008/0294655 A1* | 11/2008 | Picault et al. ................ 707/100 |
| 2010/0131527 A1* | 5/2010 | Wohlert ........................ 707/758 |

* cited by examiner

*Primary Examiner* — Alan Chen
(74) *Attorney, Agent, or Firm* — Sughrue Mion, PLLC (57) ABSTRACT

Provided are a method and an apparatus for predicting a preference rating for content, and a method and an apparatus for selecting sample content in order to predict a preference rating for the content. In the method of predicting a preference rating for the content, a list of users having similar preferences to a target user is extracted from content usage information collected with respect to the same content, and the target user's preference rating for the content is predicted by applying preference rating information of the users with similar preferences to a machine learning algorithm.

31 Claims, 9 Drawing Sheets

METHOD AND APPARATUS FOR PREDICTING PREFERENCE RATING FOR CONTENT, AND METHOD AND APPARATUS FOR SELECTING SAMPLE CONTENT

CROSS-REFERENCE TO RELATED PATENT APPLICATION

This application claims priority from Korean Patent Application No. 10-2009-0006019, filed on Jan. 23, 2009, in the Korean Intellectual Property Office, the disclosure of which is incorporated herein by reference in its entirety.

BACKGROUND OF THE INVENTION

1. Field of the Invention

Methods and apparatuses consistent with the present invention relate to a content recommending system, and more particularly, to a method and an apparatus for predicting a preference rating for content in order to recommend the content to a user, and a method and apparatus for selecting sample content necessary to predict a preference rating for the content.

2. Description of the Related Art

Various apparatuses, such as televisions (TVs), personal computers (PCs), personal media players (PMPs), and mobile phones, which are capable of reproducing content have come into widespread use. However, as the total number of pieces of content that a content providing system can possess exponentially increases, users can experience difficulty selecting desired content. Thus, content service providers manage a content recommending system in order to solve this problem. The content recommending system is designed to recommend content that the user would pay to watch, in consideration of his or her taste. To this end, this system analyzes the user's preference ratings for the content, selects content which the user would prefer to watch from a large number of pieces of content, and then recommends the selected content to the user. However, it is difficult to recommend content to a new user since the new user's preferences for the content are not yet known. Also, it is difficult to determine users to whom buying new content should be recommended since the new content has never been used.

In general, preference rating information regarding fifteen pieces of sample content is needed from the new user in order to analyze his or her preference rating for the content. Conventionally, content is randomly recommended to the new user in order to obtain the preference rating information therefor. However, since the content is recommended randomly without considering the new user's taste, it takes a long time for the new user to use and evaluate the recommended content and to provide data necessary for machine learning. If a plurality of pieces of content are selected and recommended to the new user according to popularity of the content and the preference rating information is obtained based on content that the new user selects from these recommended pieces of content, then the new user's own preference rating is difficult to determine. If a plurality of pieces of content that are very popular and preference rating information thereof, are recommended to the new user and preference rating information is obtained based on content selected by the new user from these pieces of content, then it is possible to obtain information to analyze the new user's preference for content but it takes a long time to perform machine learning.

SUMMARY OF THE INVENTION

The present invention provides a method and an apparatus for predicting a preference rating for content, so that the content can be efficiently recommended even when a user or content is new, and a method and an apparatus for selecting sample content necessary to predict a preference rating for content.

According to an aspect of the present invention, there is provided a method of predicting a preference rating for content, the method includes extracting a list of users whose content preferences are similar to a user from content usage information collected with respect to a plurality of pieces of content which are the same type as the content; and predicting the user's preference rating for the content by inputting preference rating information of the similar users indicated in the list to a machine learning process.

The method may further include obtaining preference ratings for a predetermined number of pieces of sample content from the user by providing the pieces of sample content. The extracting of the list of similar users may include obtaining the list of similar users based on the preference ratings for the pieces of sample content.

The obtaining of the preference ratings for the pieces of sample content may include dynamically selecting sample content, which is to be provided to the user, by using a preference rating for at least one piece of sample content that has been provided to the user.

The extracting of the list of similar users may include calculating a degree of similarity between the user and users indicated in the content usage information by using a Pearson correlation coefficient and based on the preference ratings for the pieces of sample content; and selecting a predetermined number of users similar to the user by using the degree of similarity.

The predicting the user's preference rating for the content may include obtaining a feature vector in which different weights are respectively assigned to elements of the feature vector according to the types of the elements.

The machine learning process may be a support vector machine (SVM).

According to another aspect of the present invention, there is provided a method of selecting sample content in order to analyze user's preference rating for content, the method includes receiving a preference rating for at least one piece of sample content from the user; detecting at least one user whose content preferences are similar to a user, by using the preference rating for the at least one piece of sample content; selecting additional sample content to be provided to the user, where the additional sample content is content to which the detected at least one similar user has a preference; and receiving a preference rating for the additional sample content from the user.

The method may further include repeatedly performing the detecting at least one user similar to the user, the selecting the additional sample content, and the receiving the preference rating for the additional sample content, until a predetermined number of pieces of sample content are assigned preference ratings.

The receiving of the preference rating for the at least one piece of sample content may include determining ranks of a plurality of pieces of content based on existing users' preference ratings; and providing the user with the at least one piece of sample content based on the determined ranks.

The determining of the ranks of the pieces of content may include determining the ranks of the pieces of content in consideration of a value obtained by subtracting the sum of negative preference ratings for the pieces of content from the sum of positive preference ratings for the pieces of content and durations during which the pieces of the content are respectively provided, where the negative and positive preference ratings are received from the existing users.

The selecting of the additional sample content may include selecting content that most of the similar users watch as the additional sample content.

The selecting of the additional sample content may include determining ranks of a plurality of pieces of content based on the similar users' preference ratings; and selecting content having a highest rank as the additional sample content from the pieces of content.

According to another aspect of the present invention, there is provided an apparatus for predicting a preference rating for content, the apparatus includes a similar user information receiving unit which receives a list of users whose content preferences are similar to a user from a server which stores content usage information collected with respect to a plurality of pieces of content which are the same type as the content; and a preference rating prediction unit which predicts the user's preference rating for the content by inputting preference rating information of the similar users indicated in the list to a machine learning process.

According to another aspect of the present invention, there is provided an apparatus for selecting sample content in order to analyze a user's preference rating for content, the apparatus includes a database which stores content and information regarding the user; a basic sample content selection unit which selects at least one piece of sample content from the database, and receives a preference rating for the at least one piece of basic sample content from the user; a similar user detection unit which detects users whose content preferences are similar to a user from the database by using the preference rating for the at least one piece of sample content; and an additional sample content selection unit which selects content to which the detected similar users have a preference as additional sample content, which is to be provided to the user, and receives a preference rating for the additional sample content from the user.

According to another aspect of the present invention, there is provided a computer readable recording medium having recorded thereon a computer program for executing the method of predicting a preference rating for content.

According to another aspect of the present invention, there is provided a computer readable recording medium having recorded thereon a computer program for executing the method of selecting sample content.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will be described more fully with reference to the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

Figure 1:
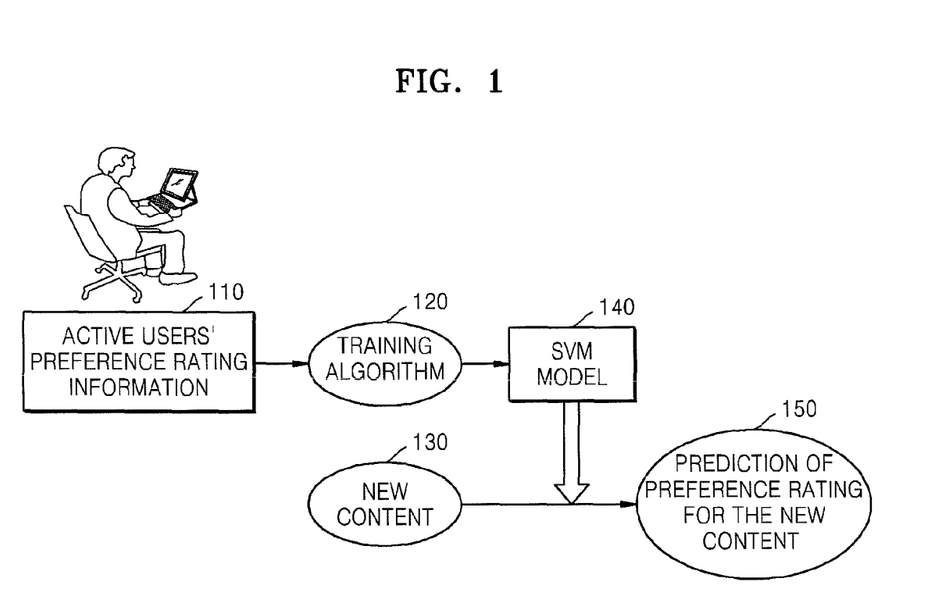
FIG. 1 is a diagram illustrating a method of predicting a preference rating for content according to an exemplary embodiment of the present invention.

FIG. 1 is a diagram illustrating a method of predicting a preference rating for content according to an exemplary embodiment of the present invention. Referring to FIG. 1, active users' preference rating information 110 regarding content, a training algorithm 120, and a support vector machine (SVM) model 140, which are machine learning algorithms, are used in order to predict a preference rating for new content 130. Here, the term "active users" means users who have used content that is provided by a content providing system (not shown). The preference rating information 110 is an evaluation of content, which is received from the active users who watch the content. For example, the active users may assign a grade or a rating to the content in order to evaluate the content. The following process is performed for this purpose. The preference rating information 110 collected from the active users is used to predict a preference rating regarding another content at a later time. The preference rating information 110 is trained via the training algorithm 120. The SVM model 140 which is a classification algorithm predicts a preference rating for the new content 130 (element 150), based on a result of implementing the training algorithm 120.

Figure 2:
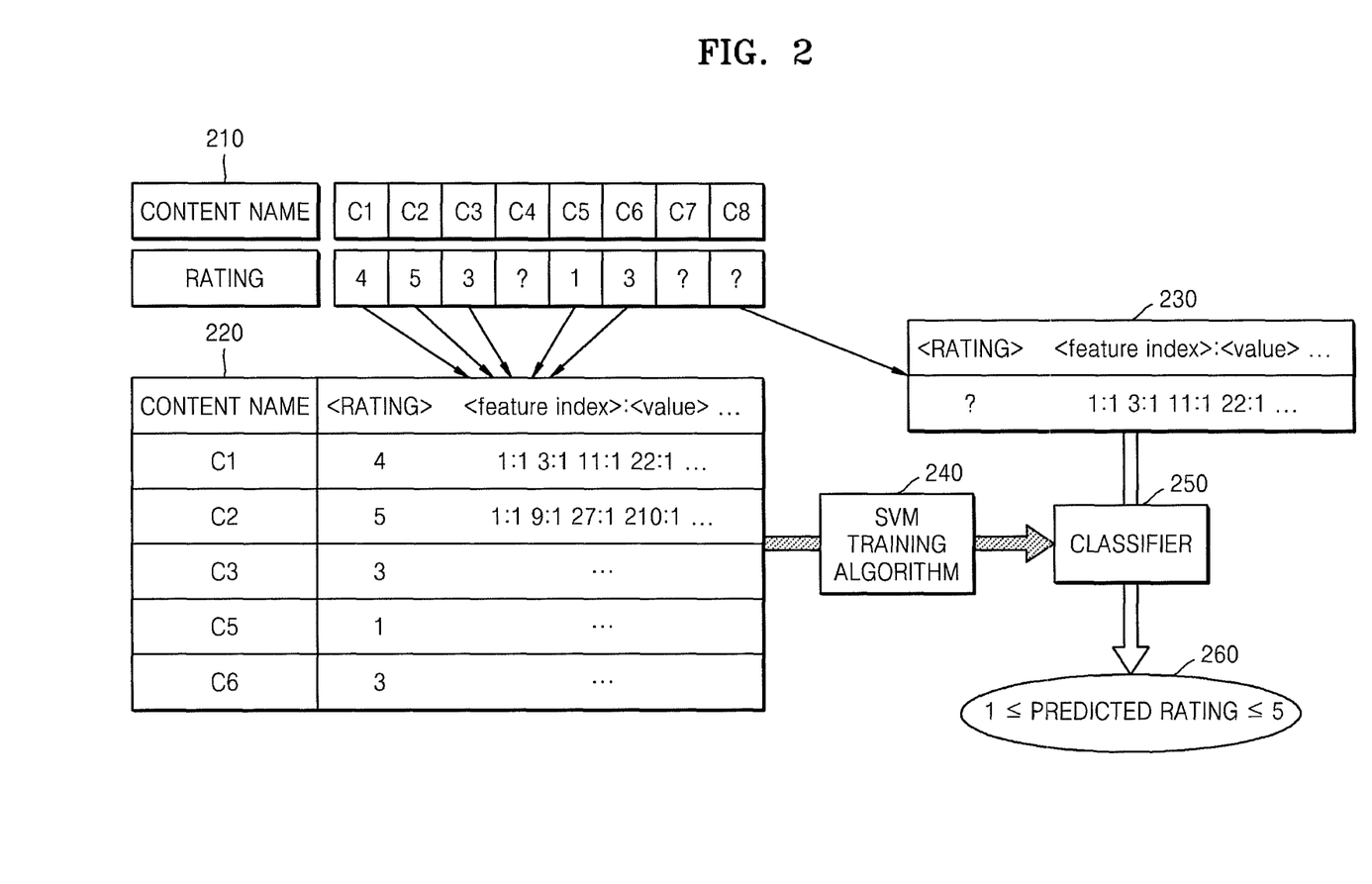
FIG. 2 is a diagram illustrating a method of predicting a preference rating for content according to another exemplary embodiment of the present invention.

FIG. 2 is a diagram illustrating a method of predicting a preference rating for content according to another exemplary embodiment of the present invention. Referring to FIG. 2, a preference rating matrix 210 denotes an active user's preference rating information regarding a plurality of pieces of content, in which ratings from 1 to 5 are assigned to the pieces of content. Specifically, the active user respectively assigns ratings of 4, 5, 3, 1, and 3 to pieces of content C1, C2, C3, C5 and C6. Other pieces of content C4, C7 and C8 are new pieces of content, the preference ratings of which need to be predicted in order to determine whether to recommend them. In feature sets 220 for the pieces of content C1, C2, C3, C5 and C6, each of the pieces of content is described using a pair of numbers which are a feature index and a value. Features are selected important elements, such as a genre, actors, a director, and keywords, which constitute metadata. A feature set 230 for new content is determined based on the metadata, and a preference rating for the new content is unknown. The feature sets 220 are learned according to an SVM training algorithm 240, and a classifier 250 predicts the preference rating for the new content based on a result of implementing the SVM training algorithm 240. The predicted preference rating has a value between 1 and 5 (260). According to an exemplary embodiment, a preference rating for new content can be predicted but preference rating information appropriate for performing the SVM training algorithm is needed in order to increase the precision of the preference rating.

Figure 3:
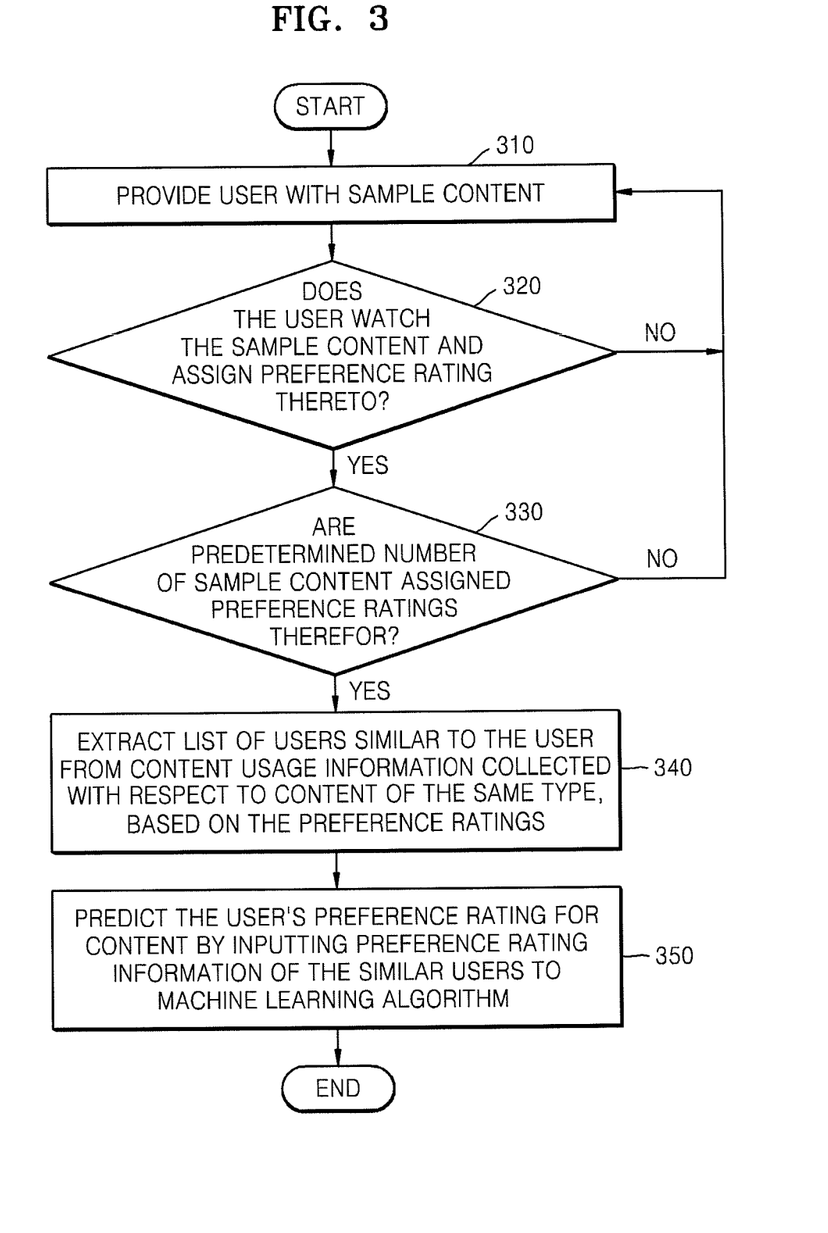
FIG. 3 is a flowchart illustrating a method of predicting a preference rating for content according to another exemplary embodiment of the present invention.

FIG. 3 is a flowchart illustrating a method of predicting a preference rating for content according to another exemplary embodiment of the present invention. In the method, in order to recommend content to a new user whose content preferences have not yet been determined, the new user's preference rating information regarding sample content and other users' preference rating information regarding content are used.

Referring to FIG. 3, a predetermined number of pieces of sample content are selected from stored content and one of the pieces of sample content is provided to the new user in order to obtain the new user's preference rating therefore (operation 310). Next, it is determined whether the new user watches the sample content and assigns a preference rating thereto (operation 320). If the new user neither watches the sample content nor assigns a preference ratings thereto, another piece of sample content is further provided (operation 310). On the other hand, if the user assigns a preference rating to the content, the process performs the next check (operation 330), described in greater detail below.

Figure 4:
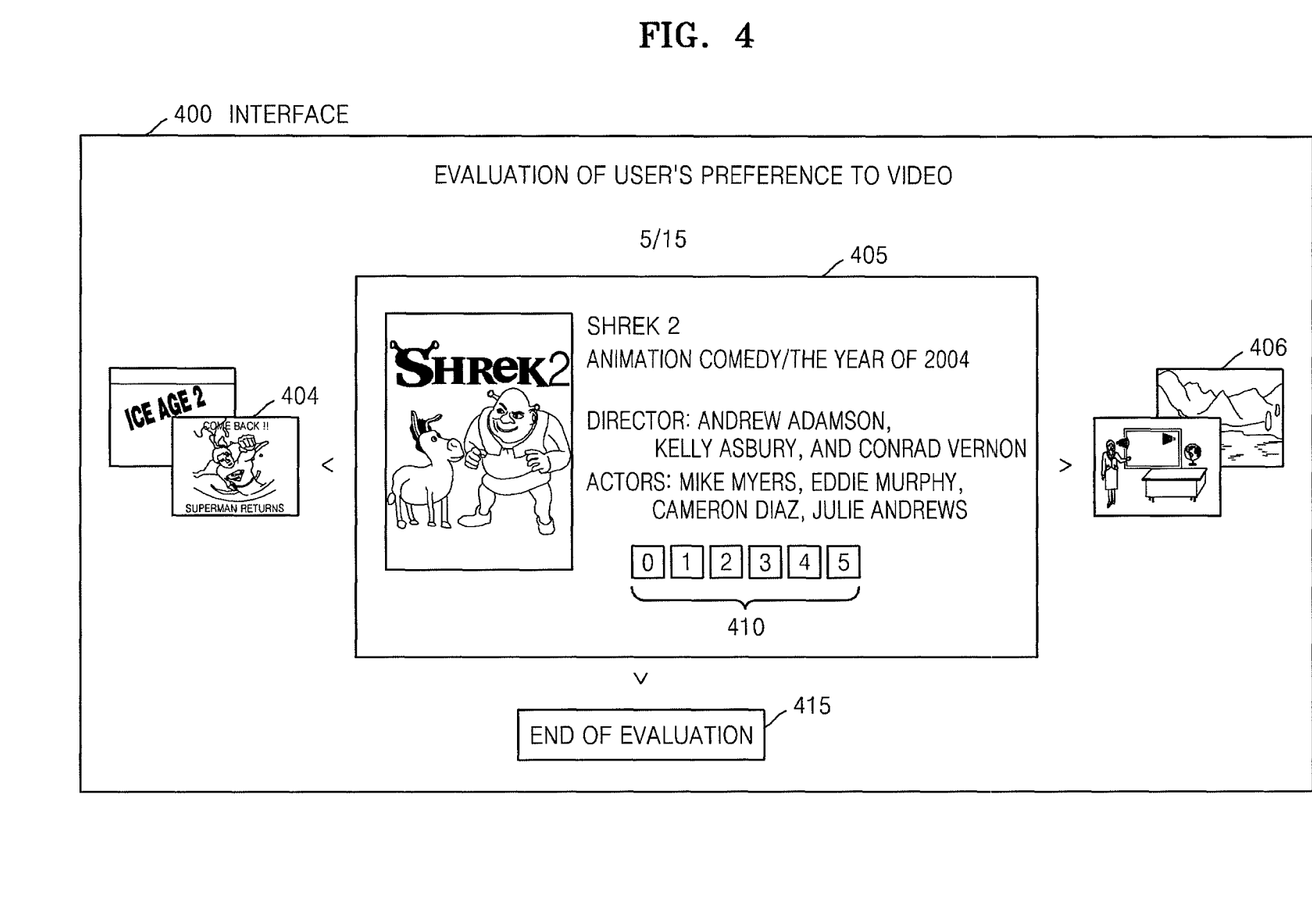
FIG. 4 illustrates an interface via which sample content is provided to a user according to an exemplary embodiment of the present invention.

FIG. 4 illustrates an interface 400 via which sample content is provided to a user according to an exemplary embodiment of the present invention. Referring to FIG. 4, fifteen pieces of sample content are provided to a user in order to evaluate the user's video preference. Referring to FIG. 4, the user may watch the movie "Shrek 2" 405 that is currently displayed, assign a preference rating to the movie "Shrek 2" 405 by using ratings 410 ranging from 0 to 5, browse previous content 404 or subsequent content 406, and assign a preference rating to the previous or subsequent content 404 or 406. For each sample content currently displayed, a number is provided indicating which piece of content is currently being viewed and evaluated. As shown in FIG. 4, the piece of content 405 is 5/15 i.e., fifth piece of content out of fifteen pieces of content. When the user has finished evaluating sample content, the user selects end of evaluation 415.

Sample content may be selected randomly or by considering other users' preference ratings therefor but the present invention is not limited thereto. For example, if sample content is dynamically selected and provided to the user based on a preference rating for at least one piece of content that was previously provided to the user, then content which the user is likely to prefer is provided as sample content to the user, and thus, the user is likely to watch the sample content and assign a preference rating for the sample content. A method of dynamically selecting sample content will be described in greater detail further below with reference to FIG. 6. Referring back to FIG. 3, when the user assigns the preference rating for the sample content, it is determined whether a predetermined number of pieces of the sample content are assigned preference ratings therefor (operation 330). If the predetermined number of pieces of the sample content have not yet been assigned preference ratings, other pieces of sample content are provided (operation 310).

When the predetermined number of pieces of sample content are assigned preference ratings, a list of users having similar preferences is extracted using the assigned preference ratings. Information regarding the similar users is obtained from content usage information collected with respect to content of the same type (operation 340). A degree of similarity between the new user and users indicated in the content usage information is calculated based on the assigned preference ratings, and a predetermined number of similar users are selected using the degree of similarity. The Pearson correlation equation given in Equation 1 may be used in order to detect the predetermined number of similar users, as follows:

$$r_{IAB} = \frac{\sum_{i=CC}(CR_{Ai} - \overline{CR_A}) \cdot (CR_{Bi} - \overline{CR_B})}{\sqrt{\sum_{i=CC}(CR_{Ai} - \overline{CR_A})^2 \cdot \sum_{i=CC}(CR_{Bi} - \overline{CR_B})^2}},$$ Equation 1 wherein $r_{IAB}$ denotes a degree of similarity between a user A and a user B, CC denotes a content count, i.e., the total number of pieces of content, $CR_{Ai}$ denotes the user A's preference rating for $i^{th}$ content, $CR_{Bi}$ denotes the user B's preference rating for $i^{th}$ content, $\overline{CR_A}$ denotes the user A's average preference rating for the pieces of the content, and $\overline{CR_B}$ denotes the user B's average preference rating for the pieces of content.

Next, the new user's preference rating for content is predicted by inputting preference rating information of users indicated in the list of similar users to a machine learning algorithm (operation 350). An SVM model may be used as the machine learning algorithm.

Accordingly, even a new user who uses a content service may be recommended content, and a preference rating for new content may be predicted according to the SVM model constructed based on information regarding the existing users.

Figure 5:
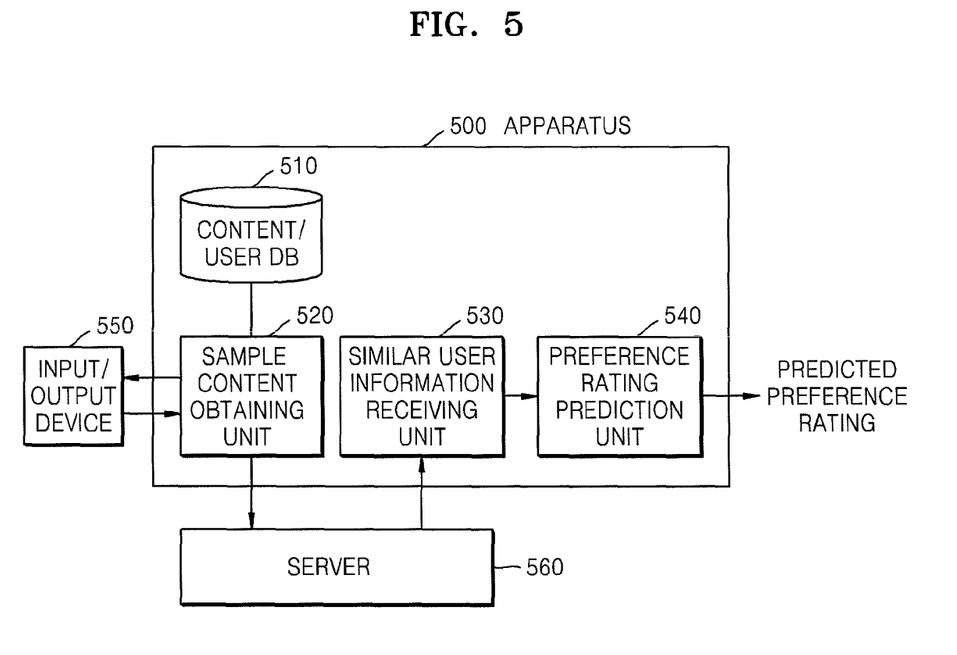
FIG. 5 is a block diagram of an apparatus for predicting a preference rating for content according to an exemplary embodiment of the present invention.

FIG. 5 is a block diagram of an apparatus 500 for predicting a preference rating for content according to an exemplary embodiment of the present invention. The apparatus 500 may be embodied as a part of a content recommending system (not shown) or a content providing system (not shown). Referring to FIG. 5, the apparatus 500 includes a content/user database 510, a sample content obtaining unit 520, a similar user information receiving unit 530, and a preference rating prediction unit 540. The sample content obtaining unit 520 selects a predetermined number of pieces of sample content from the content/user database 510, provides the selected pieces of sample content to a user, and obtains preference ratings from the user. The similar user information receiving unit 530 transmits the preference ratings to a server 560 that stores the content usage information collected with respect to the content of the same type, and receives a list of users having similar preferences from the server 560. The preference rating prediction unit 540 predicts the user's preference ratings for the content by inputting preference rating information of users indicated in the list of similar users to a machine learning algorithm. The user watches the pieces of sample content and assigns preference ratings, i.e., grades, to the pieces of sample content via an input/output device 550. The server 560 calculates a degree of similarity between the user and the users indicated in the content usage information based on the preference ratings for the pieces of sample content, and creates a list of similar users by selecting a predetermined number of similar users based on the degree of similarity. A Pearson correlation coefficient may be used in order to calculate the degree of similarity.

Figure 6:
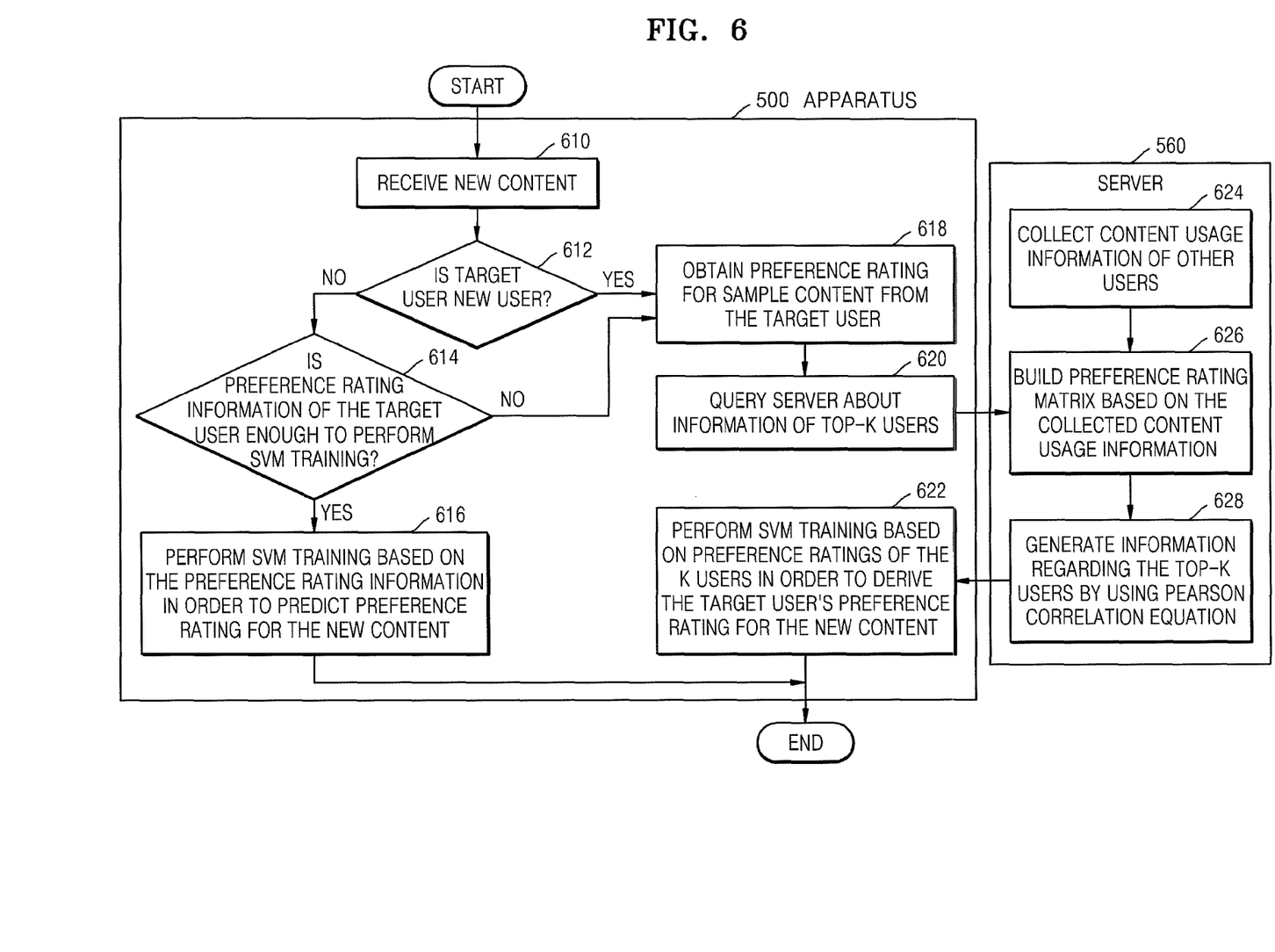
FIG. 6 is a flowchart illustrating a method of predicting a preference rating for content according to another exemplary embodiment of the present invention, in which a server provides information regarding users having similar preferences.

FIG. 6 is a flowchart illustrating a method of predicting a preference rating for the content according to another exemplary embodiment of the present invention, in which a server 560 provides information regarding users having similar preferences. Referring to FIG. 6, new content is received for which the preference rating needs to be predicted (operation 610). Next, it is determined whether a target user who will be recommended the new content by predicting a preference rating for the new content is a new user (operation 612). If the target user is not a new user, it is determined whether preference rating information of the target user is enough to perform SVM training (operation 614). If the preference rating information of the target user is enough to perform SVM training, the SVM training is performed to predict a preference rating for the new content (operation 616). When the target user is a new user or preference rating information of the target user is not enough to perform SVM training although the target user is not a new user, then operation 618 is performed since the preference rating for the new content is difficult to predict using only the existing information. For convenience of explanation, a user who is not a new user but whose preference rating information is not enough to perform SVM training, will be referred to as a new user. Next, sample content is provided to the target user in order to receive a preference rating for the sample content from the target user (operation 618).

Information regarding the preference rating for the sample content, which is received from the new user, is transmitted to a server 560 in order to request information regarding top-k users which are a predetermined number k of users having the most similar preferences to the target user (operation 620). The information regarding the preference rating for the sample content may be described in the form of a preference rating matrix. The server 560 collects content usage information of other users from an audience rating survey company and/or a content providing system (operation 624). The content usage information regarding the other users includes content usage histories and preferences of the other users with respect to content of the same type as the new content. The server 560 builds the preference rating matrix based on the collected content usage information (operation 626). In response to a query received from the apparatus 500 of FIG. 5, the server 560 generates the information regarding the top-k users by detecting k users from among users having similar preferences to the target user, based on the preference rating matrix of the content usage information and the information regarding the preference rating for the sample content which is received from the apparatus 500 (operation 628). The information regarding the top-k users is transmitted in the form of a preference rating matrix of the k users to the apparatus 500. The preference rating matrix of the k users is used as data appropriate for performing SVM training. The apparatus 500 performs SVM training based on the preference rating matrix of the k users, and derives the target user's preference rating for the new content based on a result of performing the SVM training (operation 622).

A feature vector defines each feature included in information as one element. The features defined by the feature vector are used as basic materials for performing machine learning. In general, a keyword-based binary feature vector is obtained by expressing keywords included in metadata consisting of, for example, the title, category, tag, and description of content, in the form of binary digits. That is, a feature value is '1' when one feature element (keyword) is included in the metadata, and is '0' when one feature element (keyword) is not included in the metadata. However, if different weights are assigned to elements included in a feature vector according to the type of element, it is possible to more effectively perform machine learning, thereby increasing the precision of prediction. A weight may be determined according to the importance of an element included in the feature vector.

For example, it is assumed that, in terms of the order of importance of information, title>category>tag>description, and thus, a weight of 1 is assigned to a feature element detected from the title, a weight of 0.75 is assigned to a feature element detected from the category, a weight of 0.5 is assigned to a feature element detected from the tag, a weight of 0.25 is assigned to a feature element detected from the description, and a weight of 0 is assigned to a keyword that is not included in the meta data. If keywords are detected from metadata regarding content A as shown in Table 1, a feature set may be defined as shown in Table 2.

TABLE 1

| Type | Keyword |
|---|---|
| Title | T1, T2, T3, T4 |
| Category | C1 |
| Tag | t1, t2, t3, t4, t5 |
| Description | D1, D2, D3, D4, D5, D6, D7, D8, D9, D10 |

TABLE 2

| Element Name | | | | | | | | |
|---|---|---|---|---|---|---|---|---|
| | T2 | C1 | t2 | T5 | D10 | T4 | C3 | T7 | ... |
| Value | 1 | 0.75 | 0.5 | 0 | 0.25 | 1 | 0 | 0 | |

Figure 7:
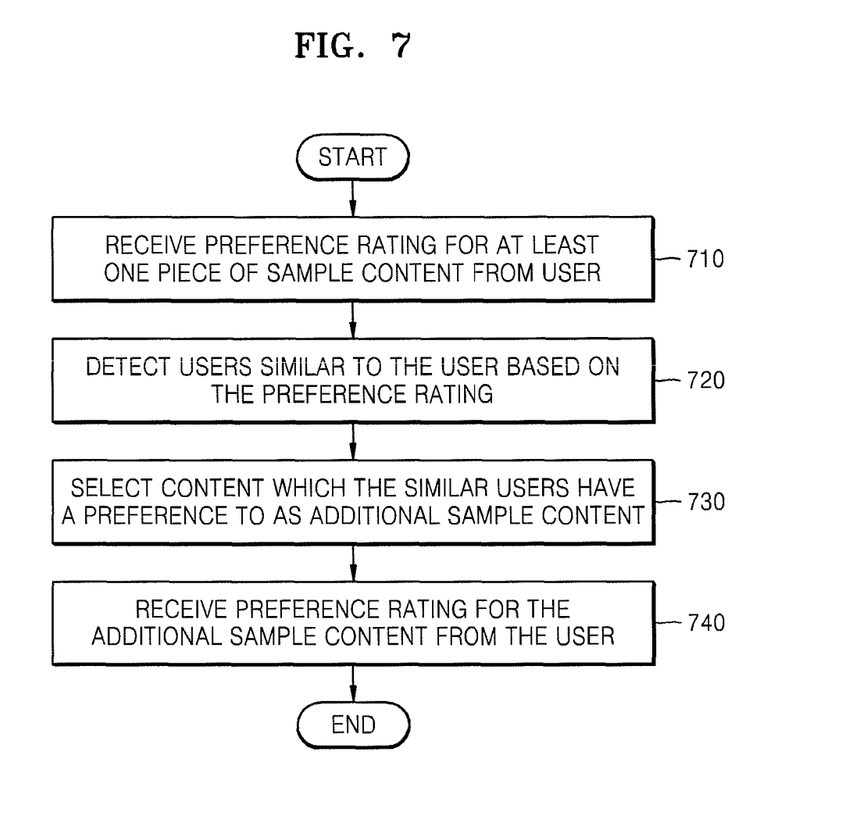
FIG. 7 is a flowchart illustrating a method of selecting sample content according to an exemplary embodiment of the present invention.

FIG. 7 is a flowchart illustrating a method of selecting sample content according to an exemplary embodiment of the present invention. FIG. 7 relates to a method of recommending content in order to obtain a predetermined number of preference ratings necessary to analyze a new user's content preferences. Referring to FIG. 7, at least one piece of sample content is provided to the new user, and a preference rating for the sample content is received from the new user (operation 710). The sample content provided in operation 710 will be referred to as basic sample content in order to distinguish it from sample content selected in operations 720 to 740. In this case, it is sufficient to obtain some of preference ratings necessary to analyze the new user's content preferences by using a machine learning algorithm. For example, if fifteen preference ratings are needed, then x preference ratings are obtained from the fifteen preference ratings in operation 710 and preference ratings for other additional y (=15−x) pieces of sample content are dynamically obtained in operations 720 to 740. In order to select the sample content to be provided to the new user in operation 710, ranks of a plurality of pieces of content may be determined based on the existing users' preference ratings for content and at least one piece of sample content may be selected from the pieces of content based on the determined ranks. Until x preference ratings are received, the pieces of content are sequentially provided to the new user according to the ranks.

Next, at least one user having similar preferences to the new user is detected using the preference ratings for x pieces of sample content (operation 720). Here, the similar user may be defined as a user who assigns the same preference rating or a similar preference rating to the same content. Next, a plurality of pieces of content to which the at least one detected similar user has a preference are selected as a plurality of pieces of additional sample content to be provided to the new user (operation 730). Next, ranks of the pieces of sample content that the at least one detected similar user watches are determined, the pieces of sample content are sequentially provided to the new user according to the determined ranks, and then, preference ratings for the pieces of sample content are received from the new user (operation 740). In operation 740, the ranks of the pieces of sample content may be determined based on the at least one similar user's preference ratings therefor. Then, until preference ratings for y pieces of additional sample content are obtained, operations 720 to 740 are repeatedly performed.

Figure 8:
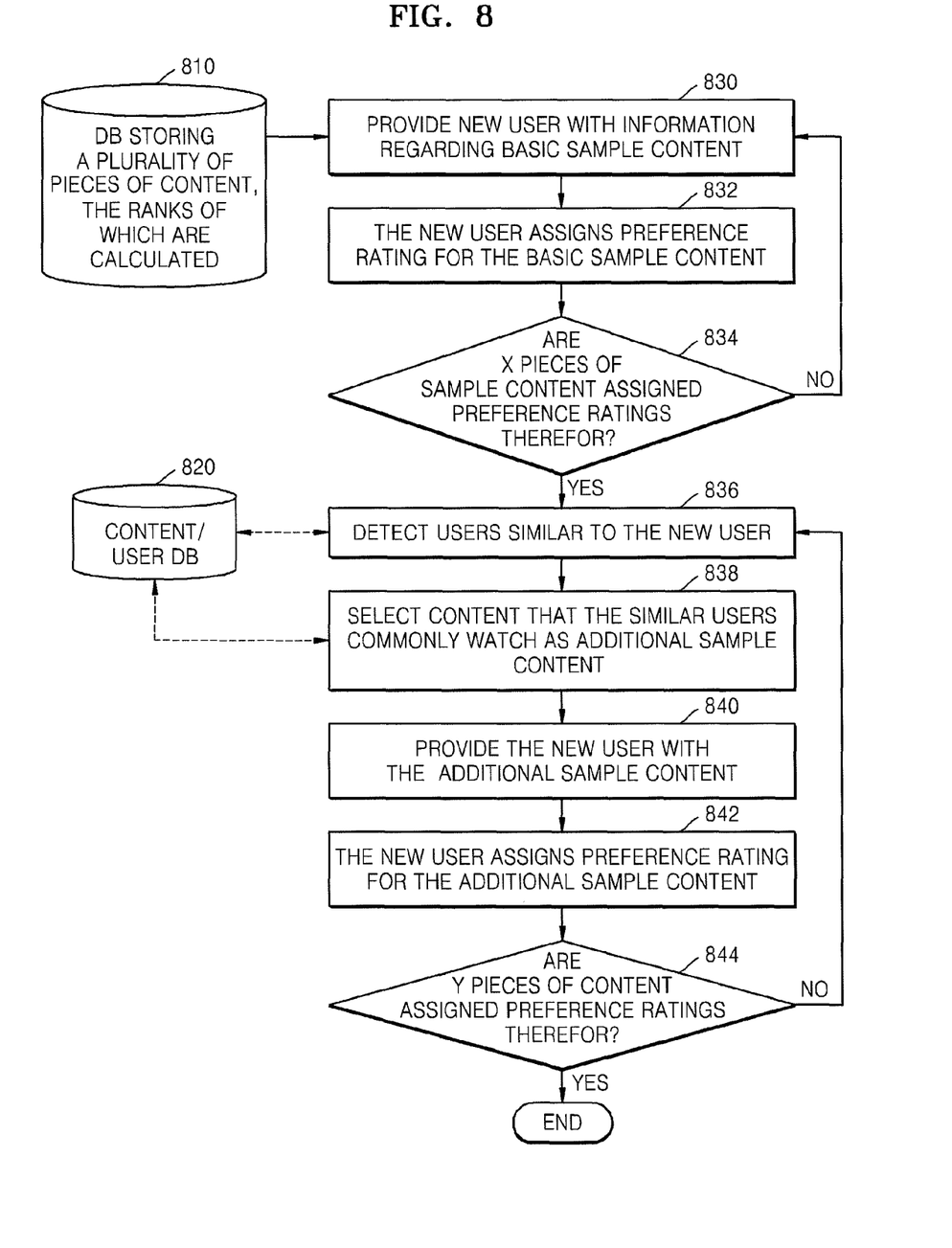
FIG. 8 is a flowchart illustrating a method of selecting sample content according to another exemplary embodiment of the present invention.

FIG. 8 is a flowchart illustrating a method of selecting sample content according to another exemplary embodiment of the present invention. In the method of FIG. 8, x pieces of basic sample content and y pieces of additional sample content are selected. Here, (x+y) denotes the total number of pieces of preference rating information necessary to analyze a new user's content preferences.

Referring to FIG. 8, a database 810 stores a plurality of pieces of content. The ranks of the pieces of the content have been determined by calculating popularity thereof, based on the existing users' preference ratings for the pieces of the content. The new user is provided information regarding basic sample content from the database 810, starting from basic content having a highest rank (operation 830).

A method of determining ranks of a plurality of pieces of content according to an exemplary embodiment of the present invention will now be described. A rank of specific content may be determined based on a value obtained by subtracting the sum of negative ratings from the sum of positive ratings, which are received from users who watch the specific content, and a duration during which the specific content is provided. The following Equations 2 and 3 may be used in this case.

$$\text{Preference rating} = R^+ - R^- \qquad \text{Equation 2}$$

In Equation 2, $R^+$ denotes the sum of positive preference ratings for content. For example, if the positive preference ratings range from 1 to 5, then $R^+$=the sum of all 5's+the sum of all 4's+0.5×(the sum of all 3's). $R^-$ denotes the sum of negative preference ratings for the content. For example, $R^-$=the sum of all 2's+the sum of all 1's.

$$\text{Rank} = \text{Preference rating}/\text{Log(Duration)}. \qquad \text{Equation 3}$$

In Equation 3, Duration denotes a duration during which the content is provided. In the case of moving-picture content, Duration denotes a period of time between when the content was first broadcast and the present time. The longer a duration during which the content is provided, the more preference rating information for the content there may be. Thus, the parameter Duration is used in order to fairly evaluate content that is provided for a short period of time.

When the new user watches the basic sample content provided in operation 830 and assigns a preference rating therefor (operation 832), it is determined whether x pieces of sample content are assigned preference ratings (operation 834). Here, x denotes the total number of pieces of sample content necessary to detect users similar to the new user, and is less than the total number of pieces of sample content necessary to analyze a preference rating for content. If it is determined in operation 834 that the x pieces of the content are not assigned preference ratings, then pieces of sample content having a second rank are provided to the new user from the database 810 (operation 830). If all the x pieces of the basic sample content are assigned preference ratings, users similar to the new user are detected using the x pieces of basic sample content and the content/user database 820 (operation 836). Next, content that the detected similar users have commonly watched is selected as additional sample content (operation 838) from the content/user database 820, and is provided to the new user (operation 840). The content that the detected similar users commonly watched may be content that most of the similar users have commonly watched. Alternatively, ranks of a plurality of pieces of content in the content/user database 820 may be determined based on the similar users' preference ratings therefor, and content having a highest rank may be selected as an additional sample content from the pieces of content. Equations 2 and 3 may be used to determine ranks of a plurality of pieces of content. If the new user watches the additional sample content and assigns preference rating therefor (operation 842), then it is determined whether y pieces of content are assigned preference ratings (operation 844). If it is determined in operation 842 that the y pieces of the content are not assigned preference ratings, other users similar to the new user are detected using the preference rating information obtained through operations 830 through 842 (operation 836). In this way, it is possible to quickly obtain content information necessary to perform machine learning for analyzing the new user's content preferences.

Figure 9:
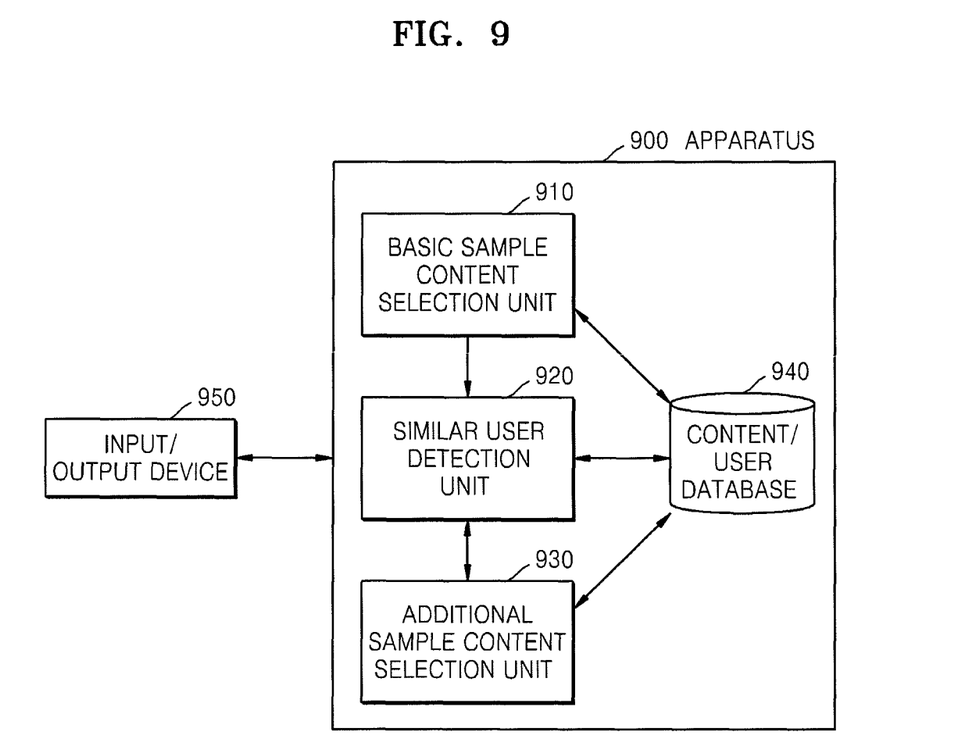
FIG. 9 is a block diagram of an apparatus for selecting sample content according to an exemplary embodiment of the present invention.

FIG. 9 is a block diagram of an apparatus 900 for selecting sample content according to an exemplary embodiment of the present invention. Referring to FIG. 9, the apparatus 900 includes a basic sample content selection unit 910, a similar user detection unit 920, an additional sample content selection unit 930, and a content/user database 940. The basic sample content selection unit 910 selects at least one piece of basic sample content from the content/user database 940, provides a user with the selected basic sample content via an input/output device 950, and receives a preference rating for the selected basic sample content from the user. The similar user detection unit 920 searches the content/user database 940 for users having similar preferences to the new user, based on the preference rating for the selected basic sample content. The additional sample content selection unit 930 selects content which most of the similar users commonly prefer as additional sample content that is to be provided to the users, and receives a preference rating for the additional sample content from the new user via the input/output device 950. The content/user database 940 stores content and information regarding the new user.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the exemplary embodiments but by the appended claims, and all differences within the scope will be construed as being included in the present invention.

The system according to exemplary embodiments of the present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

What is claimed is:

1. A method of predicting a preference rating for content, the method comprising:
   extracting a list of similar users, whose content preference are similar to a user, from content usage information collected with respect to a plurality of content pieces; and
   predicting preference rating of the user for the content by inputting preference rating information of the similar users indicated in the list to a machine learning process in which a feature set for the content is learned.

2. The method of claim 1, further comprising obtaining preference ratings for a predetermined number of pieces of sample content from the user by providing the pieces of sample content,
   wherein the extracting of the list of the similar users comprises obtaining the list of similar users based on the preference ratings for the pieces of sample content.

3. The method of claim 2, wherein the obtaining the preference ratings for the pieces of sample content comprises dynamically selecting next piece of sample content to provide to the user for preference rating based on a preference rating for at least one piece of sample content that has been provided to the user.

4. A method of predicting a preference rating for content, the method comprising:
   extracting a list of similar users, whose content preference are similar to a user, from content usage information collected with respect to a plurality of content pieces;
   predicting preference rating of the user for the content by inputting preference rating information of the similar users indicated in the list to a machine learning process;
   obtaining preference ratings for a predetermined number of pieces of sample content from the user by providing the pieces of sample content; and
   wherein the extracting of the list of the similar users comprises obtaining the list of similar users based on the preference ratings for the pieces of sample content,
   wherein the extracting the list of similar users comprises:
      calculating a degree of similarity between the user and users indicated in the content usage information by using a Pearson correlation coefficient and based on the preference ratings for the pieces of sample content; and
      selecting a predetermined number of users similar to the user by using the degree of similarity.

5. The method of claim 2, wherein the predicting the preference rating of the user for the content comprises obtaining a feature vector in which different weights are respectively assigned to elements of the feature vector according to types of the elements.

6. The method of claim 2, wherein the machine learning process is a support vector machine (SVM).

7. A method of selecting sample content to analyze a preference rating of a user for content, the method comprising:
   receiving a preference rating for at least one piece of sample content from the user;
   detecting at least one user whose content preferences are similar to the user by using the received preference rating for the at least one piece of sample content;
   selecting additional sample content to be provided to the user, wherein the additional sample content is content preferred by the detected at least one similar user; and
   receiving a preference rating for the additional sample content from the user.

8. The method of claim 7, further comprising repeatedly performing:
   the detecting of the at least one similar user,
   the selecting of the additional sample content, and
   the receiving of a preference rating for the additional sample content,
   until a predetermined number of pieces of sample content are assigned preference ratings.

9. The method of claim 7, wherein the receiving the preference rating for the at least one piece of sample content comprises:
   determining ranks of a plurality of content pieces based on preference ratings of existing users; and
   providing the user with the at least one piece of sample content based on the determined ranks.

10. The method of claim 9, wherein the determining the ranks of the plurality of content pieces comprises determining the ranks of the plurality of content pieces based on a value obtained by subtracting a sum of negative preference ratings for the plurality of content pieces from a sum of positive preference ratings for the plurality of content pieces and durations during which the plurality of pieces of the content are respectively provided, and wherein the negative and positive preference ratings are received from the existing users.

11. The method of claim 7, wherein the selecting the additional sample content comprises selecting content that most of the similar users watch as the additional sample content.

12. The method of claim 7, wherein the selecting the additional sample content comprises:
   determining ranks of a plurality of content pieces based on the preference ratings of the similar users; and
   selecting content having a highest rank as the additional sample content from the plurality of content pieces.

13. The method of claim 12, wherein the determining ranks of the plurality of content pieces comprises determining the ranks of the plurality of content pieces based on a value obtained by subtracting a sum of negative preference ratings for the plurality of content pieces from a sum of positive preference ratings for the plurality of content pieces and durations during which the plurality of content pieces are respectively provided, wherein the negative and positive preference ratings are received from the similar users.

14. An apparatus for predicting a preference rating for content, the apparatus comprising:
   a similar user information receiving unit which receives a list of users whose content preferences are similar to a user, from a server which stores content usage information collected with respect to a plurality of content pieces; and
   a preference rating prediction unit which predicts a preference rating of the user for the content by inputting preference rating information of the similar users indicated in the list to a machine learning process in which a feature set for the content is learned.

15. The apparatus of claim 14, further comprising a sample content obtaining unit which provides the user with a predetermined number of pieces of sample content and obtains preference ratings for the pieces of sample content,
   wherein the similar user information receiving unit transmits the preference ratings for the pieces of sample content, which are to be used to obtain the list of similar users, to the server.

16. The apparatus of claim 15, wherein the sample content obtaining unit dynamically selects the pieces of sample content, which are to be provided to the user, by using a preference rating for at least one of the pieces of sample content that has been provided to the user.

17. An apparatus for predicting a preference rating for content, the apparatus comprising:
- a similar user information receiving unit which receives a list of users whose content preferences are similar to a user, from a server which stores content usage information collected with respect to a plurality of content pieces;
- a preference rating prediction unit which predicts a preference rating of the user for the content by inputting preference rating information of the similar users indicated in the list to a machine learning process;
- a sample content obtaining unit which provides the user with a predetermined number of pieces of sample content and obtains preference ratings for the pieces of sample content,
- wherein the similar user information receiving unit transmits the preference ratings for the pieces of sample content, which are to be used to obtain the list of similar users, to the server, and
- wherein the server calculates a degree of similarity between the user and users indicated in the content usage information by using a Pearson correlation coefficient and based on the preference ratings for the pieces of sample content, and then selects a predetermined number of users similar to the user by using the degree of similarity.

18. The apparatus of claim 15, wherein the preference rating prediction unit obtains a feature vector in which different weights are respectively assigned to elements of the feature vector according to types of the elements, and performs the machine learning process by using the feature vector.

19. The apparatus of claim 15, wherein the machine learning process is a support vector machine (SVM).

20. An apparatus for selecting sample content in order to analyze a preference rating of a user for content, the apparatus comprising:
- a database which stores content and information regarding the user;
- a basic sample content selection unit which selects at least one piece of sample content from the database, and which receives a preference rating for the at least one piece of sample content from the user;
- a similar user detection unit which detects users whose content preferences are similar to a user, from the database by using the preference rating for the at least one piece of sample content; and
- an additional sample content selection unit which selects content to which the detected similar users have a preference as additional sample content, which is to be provided to the user, and receives a preference rating for the additional sample content from the user.

21. The apparatus of claim 20, wherein the basic sample content selection unit determines ranks of a plurality of content pieces included in the database, based on preference ratings of existing users, and provides the user with the at least one piece of sample content based on the determined ranks.

22. The apparatus of claim 21, wherein the basic sample content selection unit determines the ranks of the plurality of pieces of the content in consideration of a value obtained by subtracting a sum of negative preference ratings for the plurality of content pieces from a sum of positive preference ratings for the plurality of content pieces and durations during which the plurality of content pieces are respectively provided, wherein the negative and positive preference ratings are received from the existing users.

23. The apparatus of claim 20, wherein the additional sample content selection unit selects content that most of the similar users watch as the additional sample content.

24. The apparatus of claim 20, wherein the additional sample content selection unit determines ranks of a plurality of content pieces based on the preference ratings of the similar users, and selects content having a higher rank as the additional sample content from the plurality of content pieces.

25. A non-transitory computer readable recording medium having recorded thereon a computer program for executing a method of predicting a preference rating for content, the method comprising:
- extracting a list of users whose content preferences are similar to a user, from content usage information collected with respect to a plurality of content pieces; and
- predicting a preference rating of the user for the content by inputting preference rating information of the similar users indicated in the list to a machine learning process in which a feature set for the content is learned.

26. A non-transitory computer readable recording medium having recorded thereon a computer program for executing a method of selecting sample content in order to analyze a preference rating of a user for content, the method comprising:
- receiving a preference rating for at least one piece of sample content from the user;
- detecting at least one similar user whose content preferences are similar to the user by using the preference rating for the at least one piece of sample content;
- selecting content to which the detected at least one similar user has a preference as additional sample content to be provided to the user; and
- receiving a preference rating for the additional sample content from the user.

27. A method of predicting preferences of a user for content, the method comprising:
- obtaining a rating of at least one sample content piece from the user;
- generating a list of users with similar tastes based on the obtained user rating;
- generating a feature set for additional content; and
- predicting preference of the user for the additional content based on the generated list and the feature set using a predetermined criterion,
- wherein preference rating of the additional content is unknown.

28. The method of claim 27, wherein the rating comprises rating over duration of the respective content piece.

29. The method of claim 27, wherein the generating the feature set comprises learning the feature set based on metadata of the additional content according to an SVM training process and wherein the feature set comprises a feature index indicating an attribute of the content and a value.

30. The method of claim 1, wherein the extracting the list of similar users comprises calculating a degree of similarity between the user and users indicated in the content usage information by using a Pearson correlation coefficient.

31. The method of claim 1, wherein the predicting the preference rating of the user for the content comprises determining rating of a plurality of content pieces based on the preference ratings of the similar users and providing the user with at least one piece of sample content based on the determined rating.

* * * * *